March 20, 1962 D. H. BAUMHART 3,026,432
DYNAMOELECTRIC MACHINE
Filed July 1, 1960 2 Sheets-Sheet 2
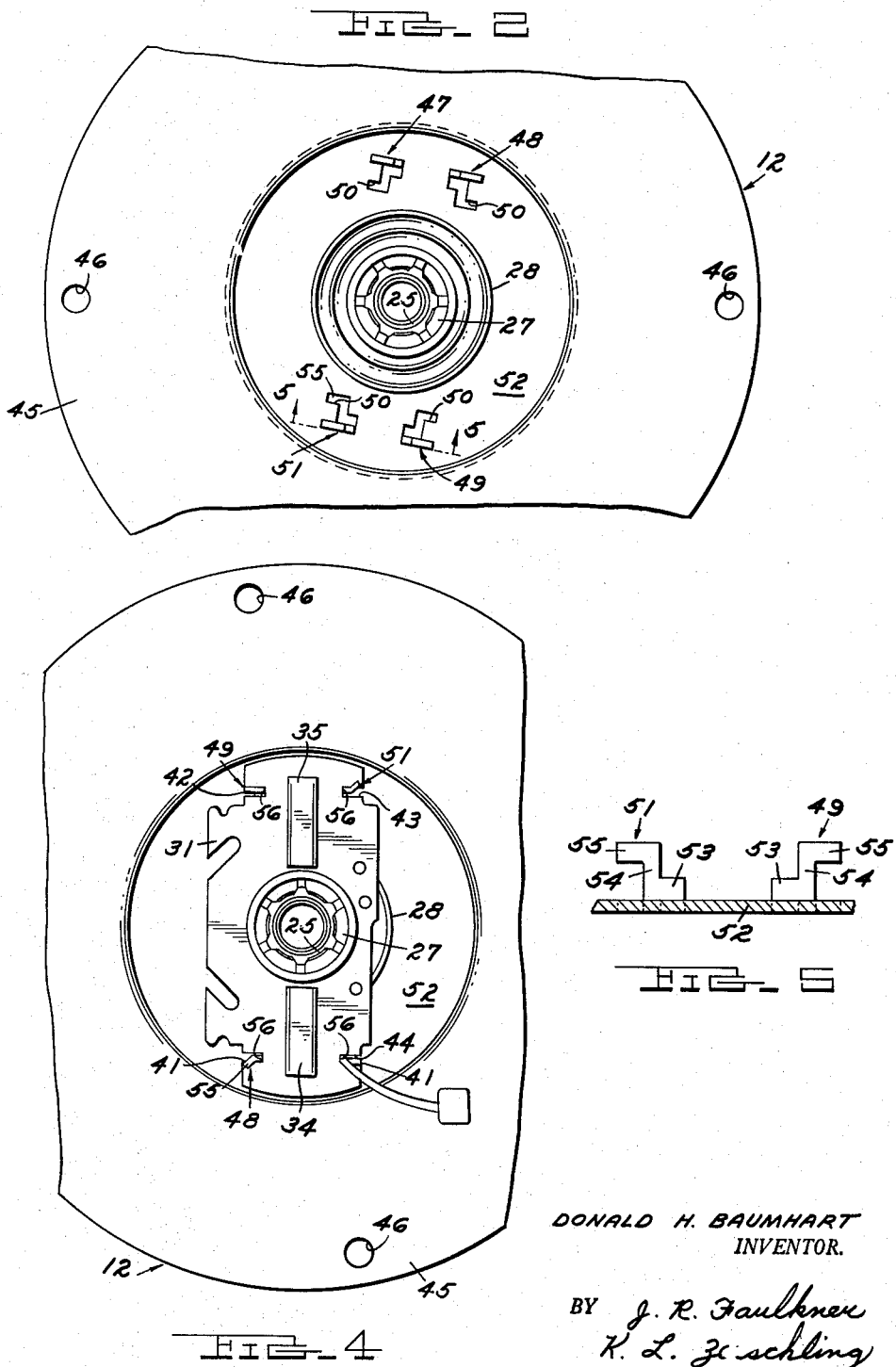
DONALD H. BAUMHART
INVENTOR.
BY J. R. Faulkner
K. L. Zschling
ATTORNEYS United States Patent Office 3,026,432
Patented Mar. 20, 1962

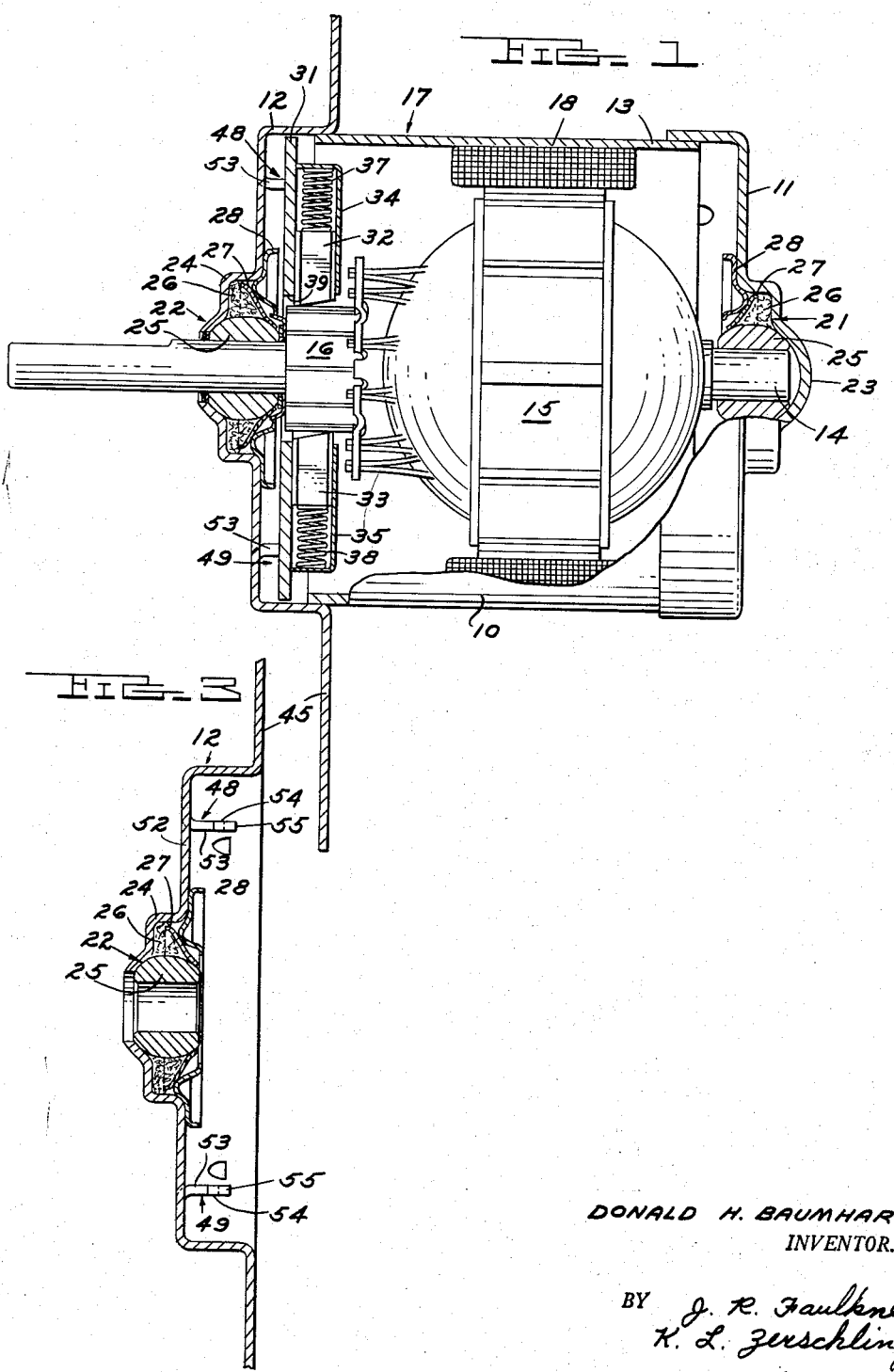

3,026,432
DYNAMOELECTRIC MACHINE
Donald H. Baumhart, Livonia, Mich., assignor to Ford Motor Company, Dearborn, Mich., a corporation of Delaware
Filed July 1, 1960, Ser. No. 40,298
4 Claims. (Cl. 310—239)

This invention relates to a dynamoelectric machine and more particularly to means for holding the brushes of such a machine in electrical contact with a current collector member.

In dynamoelectric machines some means must be provided for holding electrical contact brushes in contact with a current collector member mounted on the rotor of the machine. This current collector member may either be a commutator, in the case of a direct current machine, or a slip ring in the case of an alternator. The usual fractional horsepower dynamoelectric machine, for example a heater motor, has a brush card supporting these brushes and this brush card is supported from the stator or frame of the machine by means of bolts, rivets, screws, clips or other similar fastening means. In a low cost high production item, such as a heater motor, even the small cost of these additional fastening means may amount to more than an inconsequential percentage of the total cost of each heater motor, and hence the total cost of a great many of these fastening means may amount to a considerable sum of money. In addition, the assembly time for affixing these fastening devices to the dynamoelectric machine and for placing them in engagement with the brush cards may be considerable.

The present invention eliminates the need for these additional fastening means, and also eliminates the need for the assembly time necessary in assembling these fastening means in a dynamoelectric machine. This is accomplished by means formed integrally with an end cup of the dynamoelectric machine that engage a brush card to properly position an electrical contact brush in engagement with a current collector member. The means preferably comprise a plurality of tabs struck from the end cup of the machine, with the one portion of the tabs engaging the side of the brush card adjacent the end cup for spacing the brush card from the end cup and with another portion of the tabs engaging the other side of the brush card for securing it in position within the dynamoelectric machine.

An object of the present invention is the provision of a dynamoelectric machine having improved means for positioning brushes in contact with a current collector member.

A further object of the invention is the provision of a simple and inexpensive means for positioning electrical contact brushes in contact with a current collector member.

Another object of the invention is the provision of a means formed integrally with the stator portion of a dynamoelectric machine for positioning electrical contact brushes in the machine.

Other objects and attendant advantages of the present invention will become more readily apparent as the specification is considered in connection with the attached drawings in which:

FIG. 1 is a longitudinal sectional view of the dynamoelectric machine of the present invention;

FIG. 2 is an elevational view of an end cup of the dynamoelectric machine;

FIG. 3 is a sectional view taken along the lines 3—3 of FIG. 2;

FIG. 4 is an elevational view of the end cup of the dynamoelectric machine showing a brush card positioned by the means formed integrally with the end cup, and FIG. 5 is a view taken along the lines 5—5 of FIG. 2 and showing the means formed integrally with the end cup in elevation.

Referring now to the drawings in which like reference numerals designate like parts throughout the several views thereof, there is shown in FIG. 1 a sectional view through a dynamoelectric machine, generally designated by the numeral 10, which may be a fractional horsepower commutator type electric motor. The dynamoelectric machine includes a pair of end cups 11 and 12 affixed to a central cylindrical shell 13 by any suitable means. One means for securing the end cups to the central shell is shown and described in my co-pending application S.N. 40,297 and assigned to the assignee of this application.

A conventional rotor assembly comprising a shaft 14, an armature 15 and a current collector member or commutator 16 is suitably mounted for rotation within the stator 17. The stator includes end cups 11 and 12, cylindrical shell 13 and may include a pair of permanent magnets, one of which is shown at 18. The shaft 14 is supported by bearings 21 and 22 that are maintained within recessed end portions 23 and 24 in the end cups 11 and 12. Each of these bearings may have a sleeve 25 of porous material, rotatably supporting shaft 14, and a lubricant impregnated packing 26 which surrounds the sleeve 25 so that lubricant will seep through the sleeve to lubricate the shaft. Each sleeve may be retained within the recesses in the end cups by suitable means, for example, an annular resilient bearing spring 27 that engages the sleeve and a spring retainer 28. The spring retainers 28 may be secured to the end cups in any suitable manner, for example, by spot welding.

A rigid sheet of insulating material is constructed in the form of a brush card 31 to hold electrical contact brushes 32 and 33 in suitable receptacles 34 and 35 that may be attached to the brush card by any suitable means (not shown). The electrical contact brushes may be conveniently spring loaded in these receptacles against the current collector member or commutator 16 by means of springs 37 and 38. The brush card is preferably of substantially rectangular configuration while the receptacles 34 and 35 are preferably constructed of sheet metal formed into rectangular shaped boxes. The brush card has a central aperture 39 of slightly larger diameter than the current collector member 16, and as shown in FIG. 4, has a plurality of slots positioned in the edges thereof, designated by the numerals 41, 42, 43 and 44.

The end cup 12 may have a large annular extension 45 including a plurality of apertures 46 positioned therein for mounting the dynamoelectric machine in an automotive vehicle. The end cup 12 also has means formed integrally therewith for supporting the brush card 31 within the stator so that the electrical contact brushes 32 and 33 may be properly positioned in contact with current collector member 16. These means comprise a plurality of tabs 47, 48, 49 and 51 which may be suitably struck by means of a die from end wall 52 in the end cup 12 thereby leaving a plurality of apertures designated by the numeral 50 that may conveniently be employed to circulate cooling air through the machine. These tabs may be of generally Z-shaped configuration, and may include a first leg 53 engaging the side of the brush card 31 positioned adjacent the end wall 52, as shown in FIG. 1. This leg provides a spacing means for spacing the brush card 31 from the end wall 52. As shown in the drawings, the plane of the end wall 52 and the plane of the brush card 31 are arranged in parallel relationship, and the tabs 47, 48, 49 and 51 extend in a plane perpendicular to these two planes. Each of the tabs also includes a second leg 54 extending from the first leg through the slots 41, 42, 43 and 44 in the brush card 31. The tabs also include a third leg 55 that extends from the second leg 54 in a general direction opposite from that of the first leg. The third legs 55 engage the side of the brush card 31 that support the brush receptacles 34 and 35 and the brushes 32 and 33. Certain of the legs 55 may be bent out of the plane of the remainder of the tabs, as shown in FIG. 4 so that the brush card 31 is firmly secured between the legs 53 and 55 of each of these tabs.

As can be appreciated from an inspection of FIGS. 2 and 4, the tabs are arranged in pairs and the legs 54 of each of these pairs, for example, legs 54 on tabs 49 and 51, are spaced from each other a distance equal to the distance between the inner end walls 56 of corresponding pairs of slots, for example, slots 42 and 43. These tabs thus secure the brush card 31 in position within the stator 17 of the dynamoelectric machine so that the electrical contact brushes 32 and 33 are properly positioned against the current collector member 16. As can be appreciated, these tabs may be struck from the end wall 52 of end cup 12 in one simple operation, and in assembly the operator only need slip the brush card 31 over the tabs so that the legs 53 engage one side of the brush card and so that the legs 55 protrude through the slots in the brush card to be positioned adjacent the opposite side thereof. A simple bending operation on certain of the legs 55 then secures the brush card within the end cup 12 of the machine. The end cup 12, including brush card 31, brush receptacles 34 and 35, and brushes 32 and 33 may then be suitably assembled with the rotor and the remainder of the stator to form the completed machine.

The present invention thus provides a simple and inexpensive means for positioning electrical contact brushes in contact with a current collector member of a dynamoelectric machine in which the means are preferably formed integrally with an end cup of the machine.

It will be understood that the invention is not to be limited to the exact construction shown and described but that various changes and modifications may be made without departing from the spirit and scope of the invention as defined in the appended claims.

I claim:
1. A dynamoelectric machine comprising a stator including an end cup, said end cup being made from a deformable material, a rotor rotatably supported in said stator and including a current collector member, an electrical contact brush, a brush card supporting said brush in electrical contact with said current collector member, and a plurality of tabs struck from said end cup, said tabs struck from the end cup to allow air to pass into the dynamoelectric machine for cooling purposes and said tabs engaging said brush card for supporting said brush card in said stator.

2. A dynamoelectric machine comprising a stator including an end cup, said end cup being made from a deformable material, a rotor rotatably supported in said stator and including a current collector member, an electrical contact brush, a brush card supporting said brush in electrical contact with said current collector member and having a plurality of slots positioned therein, and a plurality of tabs formed integrally with said end cup and struck therefrom, said tabs struck from the end cup to allow air to pass into the dynamoelectric machine for cooling purposes, said tabs being positioned in said slots in said brush card and engaging said brush card for supporting said brush card in said stator.

3. A dynamoelectric machine comprising a stator including an end cup, said end cup being made from a deformable material, a rotor rotatably supported in said stator and including a current collector member, said end cup having an end wall disposed substantially perpendicularly to the axis of said rotor, a pair of electrical contact brushes, a brush card supporting said electrical contact brushes in contact with said current collector member and being positioned substantially parallel to the end wall of said end cup, said brush card having a plurality of slots positioned therein, and a plurality of tabs struck from said end cup, said tabs struck from the end cup to allow air to pass into the dynamoelectric machine for cooling purposes and said tabs extending from said end cup in a direction substantially perpendicularly to said end wall and said brush card, each of said tabs being substantially Z-shaped and having a first portion engaging the side of the brush card adjacent said end wall for spacing said brush card from said end wall, a second portion extending through one of said slots in said brush card and a third portion engaging the other side of said brush card, said third portion being bent out of the plane of the remainder of the tab.

4. A dynamoelectric machine comprising a stator including an end cup, said end cup being made from a deformable material, a rotor rotatably supported in said stator and including a current collector member, said end cup having an end wall disposed substantially perpendicularly to the axis of said rotor, a pair of electrical contact brushes, a brush card supporting said electrical contact brushes in contact with said current collector member and being positioned substantially parallel to the end wall of said end cup, said brush card having a plurality of slots positioned therein, and a plurality of tabs, said tabs struck from the end wall of said end cup to allow air to pass into the dynamoelectric machine for cooling purposes, said tabs extending from said end cup in a direction substantially perpendicularly to said end wall and said brush card, each of said tabs having a first leg engaging the side of the brush card adjacent said end wall for spacing said brush card from said end wall, a second leg extending from one end of said first leg through one of the slots in said brush card, a third leg extending from said second leg in a direction opposite from said first leg, said third engaging the other side of said brush card, said third leg being bent out of the plane of the remainder of said tab for positioning said brush card in said stator.

References Cited in the file of this patent
UNITED STATES PATENTS

| | | |
|---|---|---|
| 1,939,032 | Aufiero | Dec. 12, 1933 |
| 1,991,356 | Anderson | Feb. 19, 1935 |
| 2,036,285 | Little | Apr. 7, 1936 |
| 2,324,299 | Haifley | July 13, 1943 |
| 2,584,214 | Luther | Feb. 5, 1952 |
| 2,984,758 | Hansen | May 16, 1961 |